F. HAMACHEK.
SIDE DELIVERY MECHANISM FOR HARVESTERS.
APPLICATION FILED JULY 7, 1905.

900,727.

Patented Oct. 13, 1908.

F. HAMACHEK.
SIDE DELIVERY MECHANISM FOR HARVESTERS.
APPLICATION FILED JULY 7, 1905.

900,727.

Patented Oct. 13, 1908.

Witnesses.
C. H. Keeney.
R. S. C. Caldwell.

Inventor.
Frank Hamachek
By Benedict & Morsell
Attorneys.

F. HAMACHEK.
SIDE DELIVERY MECHANISM FOR HARVESTERS.
APPLICATION FILED JULY 7, 1905.

900,727.

Patented Oct. 13, 1908.

Witnesses.
C. H. Keeney.
R. S. C. Caldwell.

Inventor.
Frank Hamachek.
By Benedict and Morsell
Attorneys.

F. HAMACHEK.
SIDE DELIVERY MECHANISM FOR HARVESTERS.
APPLICATION FILED JULY 7, 1905.

900,727.

Patented Oct. 13, 1908.

F. HAMACHEK.
SIDE DELIVERY MECHANISM FOR HARVESTERS.
APPLICATION FILED JULY 7, 1905.

900,727.

Patented Oct. 13, 1908.

UNITED STATES PATENT OFFICE.

FRANK HAMACHEK, OF KEWAUNEE, WISCONSIN.

SIDE-DELIVERY MECHANISM FOR HARVESTERS.

No. 900,727. Specification of Letters Patent. Patented Oct. 13, 1908.

Application filed July 7, 1905. Serial No. 268,636.

*To all whom it may concern:*

Be it known that I, FRANK HAMACHEK, residing in Kewaunee, in the county of Kewaunee and State of Wisconsin, have invented new and useful Improvements in Side-Delivery Mechanism for Harvesters, of which the following is a description, reference being had to the accompanying drawings, which are a part of this specification.

This invention relates to side delivery mechanism for harvesters and particularly for harvesters intended for cutting crops of vines, such as peas and beans and clover.

It has as an object to provide the cutting mechanism with endless conveyers, one conveyer for elevating the cut material and carrying it rearwardly and depositing it upon another conveyer which carries it to one side and discharges it in a continuous windrow or in bunches, according to whether the driving means for the latter conveyer works continuously or intermittently.

Another object of this invention is to so mount a side feed delivery mechanism of the above type that it will be capable of following along with the harvester proper in its usual movements and adjustments without binding or otherwise forming any great resistance or obstruction thereto.

Another object of this invention is to provide for the driving of such side delivery mechanism from the drive wheels of the harvester, with yielding connections which will permit of sufficient independent movements of the side delivery mechanism to adapt the machine for use on uneven ground without injury to the parts or disturbance of the driving connections.

Another object of this invention is to provide such a side delivery mechanism with an elevating conveyer of a construction in which its outside conveyer parts are adapted to separate the cut material from the uncut material by reason of their different speed of movement from the other conveyer parts and by reason also of a separating wheel especially provided for this purpose.

Another object of this invention is to provide such side delivery mechanism with an elevating conveyer of a construction in which its several conveyer members are properly backed up by a decking to most effectively conduct the material and by means of the guard shield extensions of which said conveyer members are stripped of the cut material which they carry in such a manner as to evenly distribute it in the discharging conveyer.

Another object of this invention is to provide such a side delivery mechanism with means for straightening out the vines or lodged grain before they are cut by engaging them and moving them upwardly and rearwardly.

Another object of this invention is to improve upon and perfect the details of construction and arrangement of parts of such a side delivery mechanism.

Referring to the accompanying drawings in which like characters of reference indicate the same parts in the several figures: Fig. 3 is a side elevation, viewing the side delivery mechanism from the other side of the machine from which Fig. 1 is seen.

In these drawings the harvester proper, which may be of any approved type, is illustrated as comprising the usual pair of drive wheels 10 with the frame construction 11 mounted thereon and carrying and operating the reciprocating cutting mechanism 12 in the ordinary manner, that is by having the cutter bar projecting from an inside shoe 13 which is swiveled and pivotally mounted upon a coupling frame 14 with the crank and pitman connection 15 for reciprocating the sickle bar.

As the side delivery mechanism constituting this invention is designed to permit of the usual lifting and tilting of the cutting mechanism, the means for accomplishing such lifting and tilting have been illustrated. The hand lever 16 which is carried by a bell crank lever 17 pivotally mounted upon the draft bar of the harvester is connected to the usual gag lever 18. By means of the hand lever 16 or the foot lever 19, which is in connection therewith, the gag lever may be lifted to first lock the cutting mechanism against swinging and then raise the same. For tilting the cutting mechanism, the sleeve 20 which is loosely mounted on the coupling frame 14 and has the inside shoe 13 pivotally mounted thereon is adapted to be turned by means of the hand lever 21 which is connected with it by a rod 22.

The side delivery mechanism constituting this invention is in the nature of an attachment for the ordinary type of harvester, though it may constitute an inseparable part of the harvester. It is intended to be in the form of a carriage or other suitably supported frame connected with the cutting mechanism to trail behind the same and receive the cut material therefrom, and its functions are to first lift the material with an elevating conveyer, and then drop it onto a discharging conveyer in the rear, which may be operated at will to continuously carry the material to one side and dump it behind the harvester proper in a windrow or to intermittently deposit it in bunches. The power for operating the elevating conveyer and the discharging conveyer is preferably derived from the drive wheels of the harvester proper through yielding connections.

Figure 6:
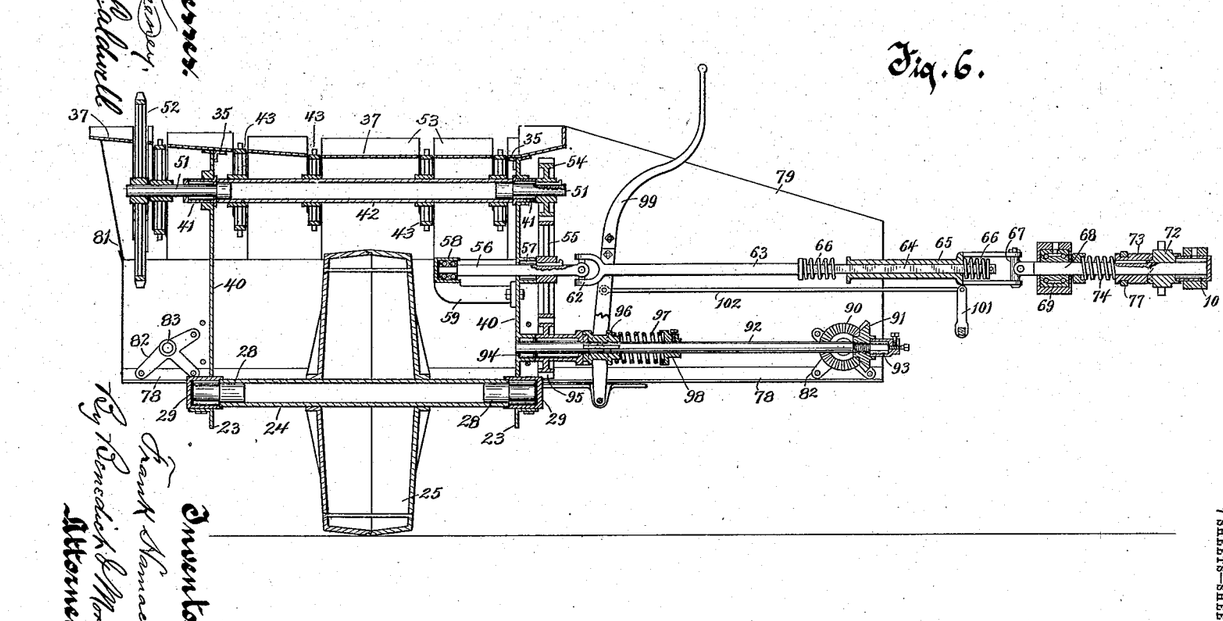
Fig. 6 is a sectional elevation of the side delivery mechanism, looking toward the rear thereof and taken through the centers of the several transverse shafts at its rear part and in different vertical planes.
Figures 7, 8:
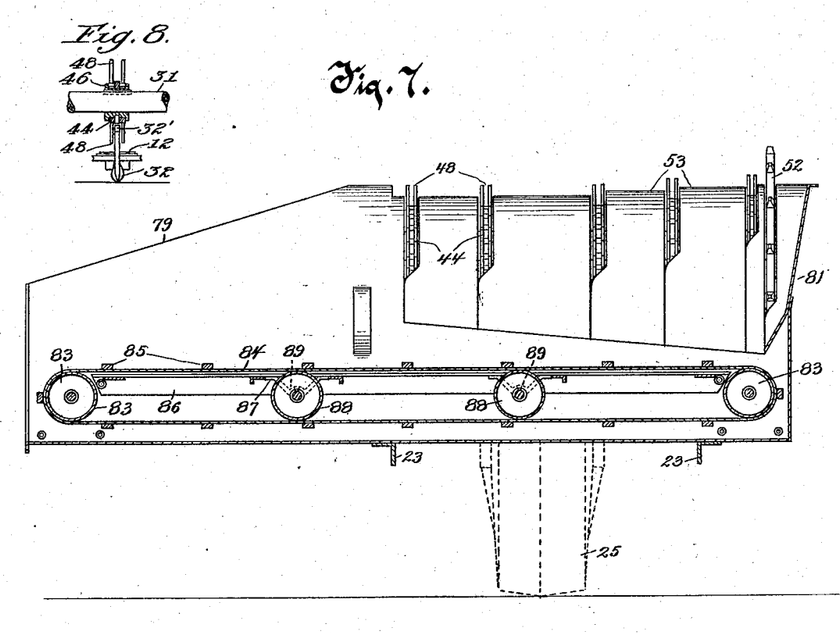
Fig. 7 is a sectional elevation of the discharging conveyer, taken on the plane of line 7—7 of Fig. 2 and looking toward the front of the machine.
Fig. 8 is a detail view in front elevation of a portion of the crop straightening mechanism.

As here shown the carriage for the side delivery mechanism comprises a frame with a pair of parallel sills 23 of angle iron construction which are connected at an intermediate portion by a shaft 24 carrying a large hollow rounded-tread carrying wheel 25, and which have brackets 26 connected to their front ends with guide wheels 27 adjustably journaled therein and riding on the ground with the carrying wheel. The carriage for the side delivery mechanism is thus pivotally mounted upon the large rounded tread carrying wheel 25 at about its middle portion and rests on the pair of guide wheels 27 at the sides of its front portion. As seen in Fig. 6, the carrying wheel 25 is formed in shell like half-sections with overlapping flanges at their meeting edges, and the shaft 24 on which it is mounted is made of hollow tubing in order to reduce the weight, which object will be found to be consistently observed throughout the construction. In the ends of the tubular shaft 24 are mounted trunnion plugs 28 which fit into closed roller bearings 29 on the sills 23.

The brackets or castings 26 after forming supports for the guide wheels 27 extend forwardly and form journal bearings 30 in which a tubular shaft 31 is mounted directly above the sickle bar of the cutting mechanism. The guard fingers 32 of the cutting mechanism are preferably of the movable or pivoted type, in which there is a body portion rigidly connected to the finger bar and a movable member pivoted thereto so as to swing and follow the irregular surface of the ground. The body portions of certain of them are provided with forwardly and upwardly extending arms 33 which are pivotally connected to lugs 34 on the extremities of the brackets 26, whereby the cutting mechanism, besides having its usual connection with the harvester proper, is pivotally suspended from the frame of the side delivery mechanism.

An inclined conveyer frame is carried by the frame previously mentioned and comprises the slightly curved side bars 35 of angle iron construction which are connected by cross rods 36 supporting a curved sheet metal decking 37. This inclined frame is rigidly connected with the brackets or castings 26 at its front lower end and is braced from the sills 23 by braces 38 near the front end and by braces 39 near the rear end, the latter connecting with the sills 23 at the journal bearings 29 of the carrying wheel 25. At its rear end the inclined frame is supported on a gear frame formed of side plates or castings 40 on each side which rest upon the sills 23.

Figure 1:
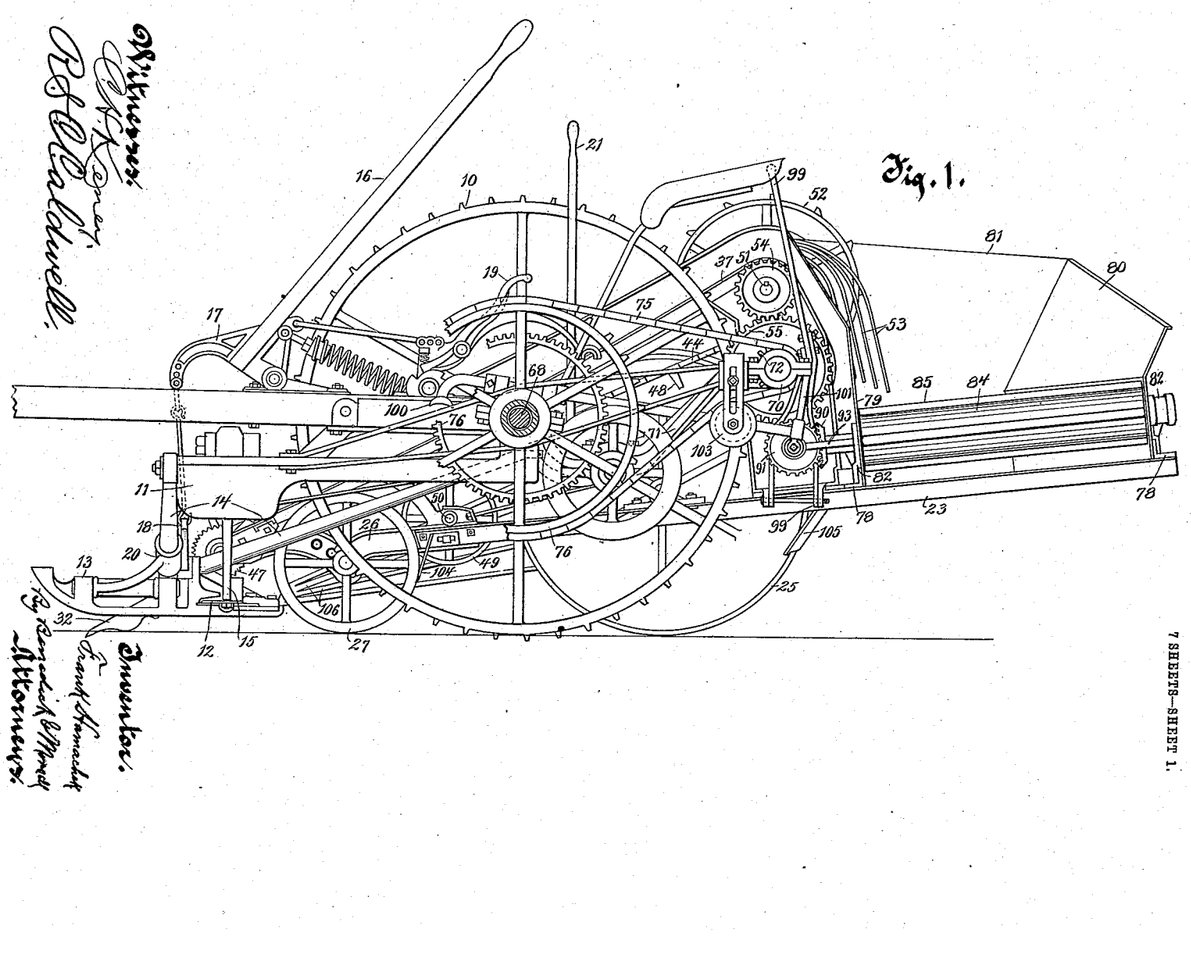
—Figure 1 is a side elevation of a mower having the improved side delivery mechanism constituting this invention embodied therewith, one drive wheel and other parts being broken away for clearness of illustration.
Figure 2:
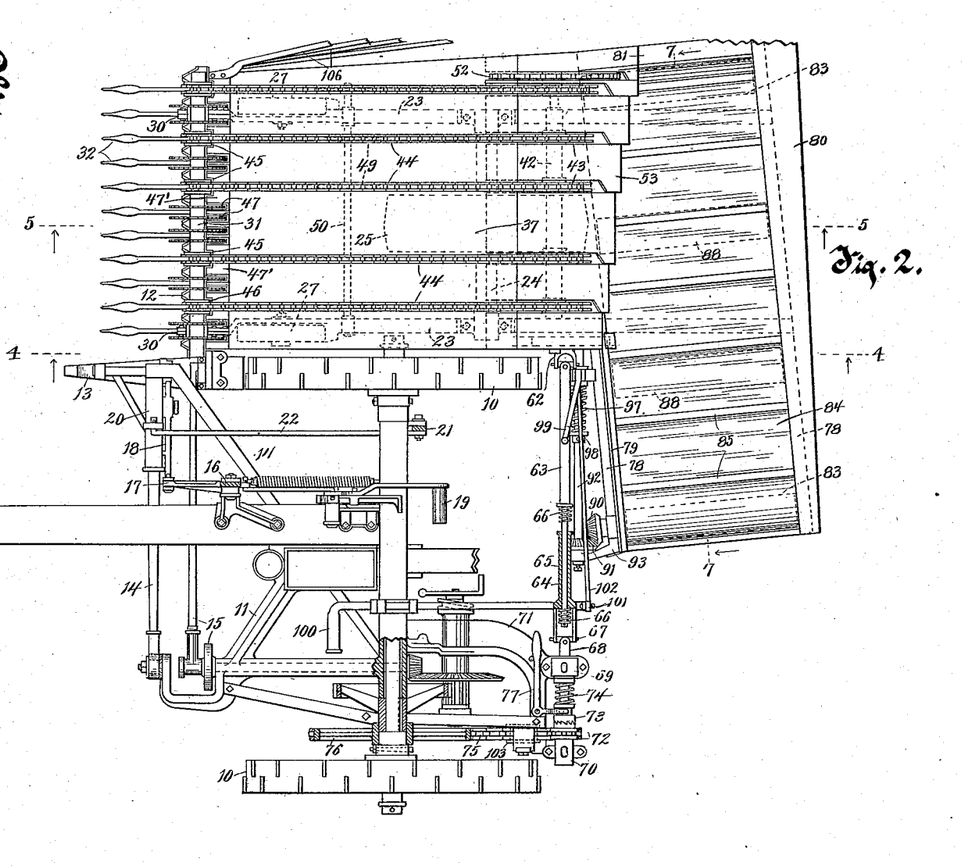
Fig. 2 is a plan view thereof; also having parts broken away.
Figure 3:
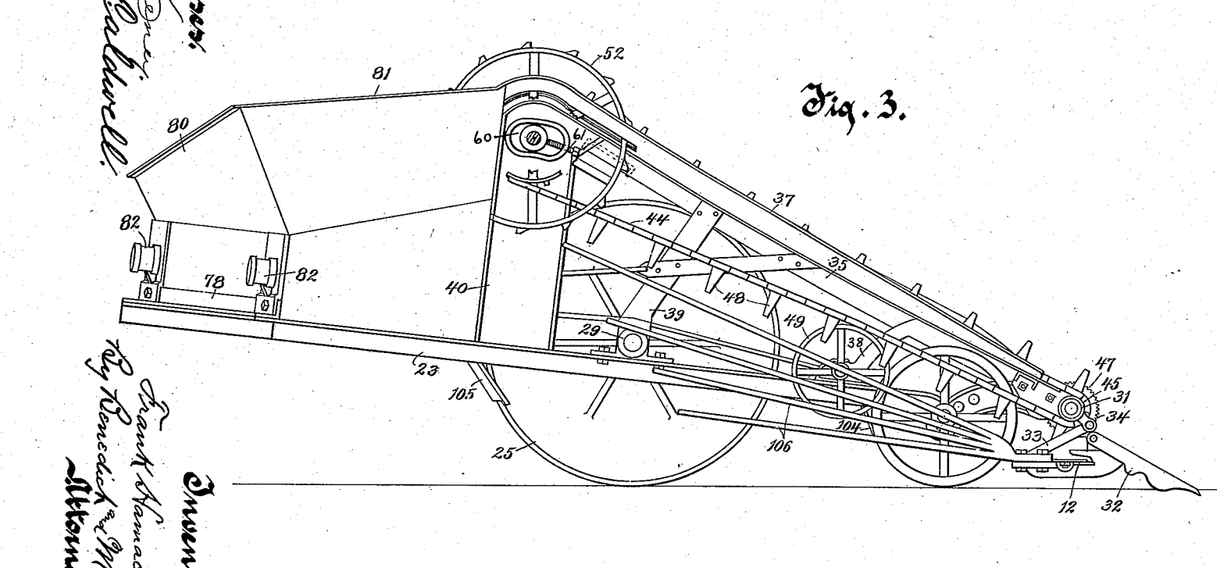
Figure 4:
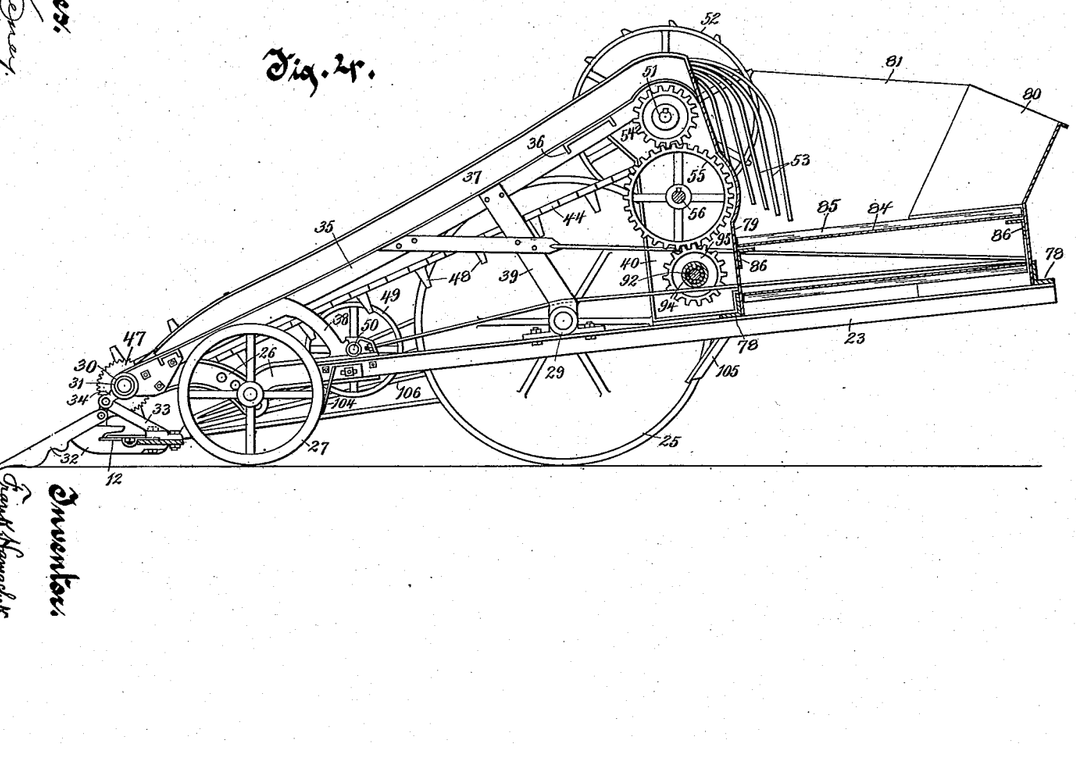
Fig. 4 is a sectional elevation of the side delivery mechanism, taken on the plane of line 4—4 of Fig. 2.
Figure 5:
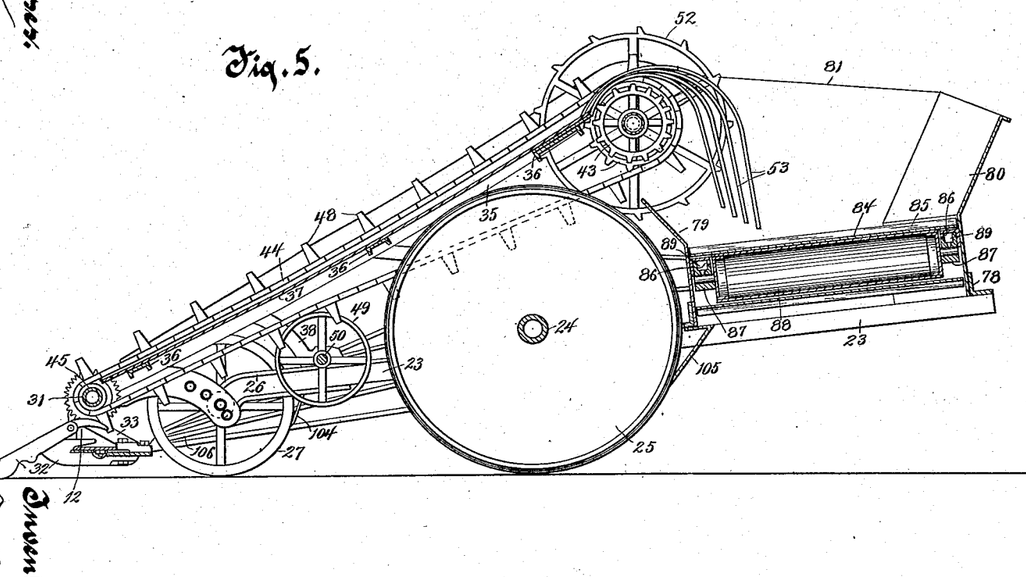
Fig. 5 is a similar view, taken on the plane of line 5—5 of Fig. 2.

At the upper ends of the side plates 40 are roller bearings 41 in which is journaled a conveyer shaft 42 extending across the inclined frame and having a series of sprocket wheels 43 fixed thereon. A series of conveyer chains 44 are passed around the sprocket wheels 43 and also around chain guiding spools 45 which are loosely mounted on the shaft 31 at the front end of the inclined frame, said conveyer chains returning upwardly along the curved decking 37, slightly above the same. The curvature of said decking is made to conform to the natural curvature of the chains to remain close thereto without coming into frictional contact therewith. One of the conveyer chains 44 instead of passing around a loose spool on shaft 31 passes around a sprocket wheel 46 which is fixed thereon so that rotation may be given to said shaft and thus reduce the friction of the spools 45 on it. The rotation of the shaft 31 also causes the rotation of pairs of toothed disks 47 which are mounted on it on each side of such guard fingers 32 as do not have the spools 45 or the sprocket wheel 46 thereabove. The conveyer chains 44 have pairs of outwardly extending spurs or carrying arms 48 at regular intervals, which with the assistance of the toothed disks 47 engage and straighten the material while it is being cut by the cutting mechanism after which it is carried upon the chain conveyers and the curved decking 37 to the upper end of the inclined frame. On their return beneath the decking to the lower front end of the inclined frame, the chain conveyers 44 are prevented from sagging by riding over idler wheels 49 which are mounted upon a shaft 50 journaled on the sills 23, the pairs of spurs or arms 48 embracing the rims of said wheels as they pass. The movable members of some of the guard fingers 32, as shown in Fig. 5, have rearwardly projecting curved chain guiding fingers 32' which by projecting between the pairs of spurs or arms 48 of the chain conveyers guide the chains onto the spools 45.

The sprocket wheels 43 over which the chain conveyers pass at the upper end of the inclined frame are not all of the same size, but at the outer edge of the conveyer they gradually increase in diameter, so that the conveyer chains move faster on that side for the purpose of separating the cut vines from the uncut vines. For this purpose also the shaft 42 on which these sprocket wheels are mounted carries on its outer trunnion plug 51 a toothed wheel 52 resembling a sprocket wheel, but much larger than the sprocket wheels 43 and having no chain thereon.

At the upper end of the decking 37 of the elevating conveyer and in extension thereof are arranged a series of guard shields 53 which are formed of sheet metal and which are spaced apart a sufficient distance to permit the sprocket wheels and the conveyer chains and their prongs passing between them and which successively curve downwardly over the shaft 42 at a greater distance to the rear from the innermost shield to the outermost shield, so that they strip the material from each conveyer chain and carry it farther to the rear than the material of the inner conveyer chain next thereto. These guard shields are also located on either side of the toothed wheel 52 for the same purpose.

The shaft 42 is tubular with trunnion plugs 51 in its end, similar to shaft 24, and it is these trunnion plugs 51 which are journaled in the bearings 41. One trunnion plug 51 has keyed to it a gear wheel 54 meshing with a larger gear wheel 55 carried by a shaft 56. This shaft is journaled in a roller bearing 57 on the side of the inner side plate 40 and is also journaled at one end in a roller thrust bearing 58 which is carried by a bracket 59 secured to said side plate. The journal bearings 41 for the shaft 42 are adjustable in arc shaped slots 60 of the side plates 40, said slots being concentric with the gear wheel 55, so that during the adjustments of the bearings 41 the gear wheels 54 and 55 will remain in mesh with each other. The adjustment of the bearings 41 in the slot 60 is accomplished by means of set screws 61 and is for the purpose of increasing or diminishing the tension upon the conveyer chains 44.

The inner end of shaft 56 is connected by means of a universal coupling 62 with the end of a rod 63 whose other end is square in cross section at 64, where it slidably fits within a correspondingly shaped sleeve 65, the movement of the rod 63 within the sleeve 65 being determined and cushioned by means of coil buffer springs 66 mounted on said rod and engaging a shoulder and a cotter pin respectively. The inner end of sleeve 65 is connected by a universal coupling 67 with a shaft 68, which is journaled in a thrust bearing 69 and a roller bearing 70 on a rear bracket 71 forming part of the harvester frame. A sprocket wheel 72 is loosely mounted on shaft 68 between the bearings 69 and 70 and is adapted to be engaged by a toothed clutch 73 which is splined on said shaft and is pressed into engagement with the sprocket wheel by means of a coil spring 74 surrounding the shaft and bearing on a collar thereof. A sprocket chain 75 connects the sprocket wheel 72 with a large sprocket wheel 76 on the drive shaft of the harvester in order that the motion of the drive wheels 10 during the travel of the harvester will be imparted through said sprocket wheel 76 and the sprocket chain 75 to the sprocket wheel 72 and the shaft 68 when the clutch 73 is in engagement. The motion of the shaft 68 is transmitted through the universal connection 67 and the slidable splined sleeve 65 to rod 63, which in turn transmits it through the universal connection 62, shaft 56 and gear wheels 55 and 54 to shaft 42, and thereby causes the operation of the conveyer chains 44. A lever 77 is pivotally mounted on the bracket 71 and engages with the clutch 73 whereby the operator may disengage the clutch whenever desired against the pressure of spring 74 and so stop the operation of the conveyer chains and other mechanism driven from this same source.

A pair of parallel sills 78 are connected across the rearwardly extending ends of the sills 23 of the conveyer frame in an oblique direction, that is to say they do not extend at right angles to the sills 23, but they recede from the line of the cutting mechanism as they approach the harvester proper. These sills 78 form a frame for a discharging conveyer which is provided with inclined sheet metal sides 79 and 80 respectively and a similar end wall 81. Journal brackets 82 are supported on the sills 78 at each end of the discharging conveyer frame and end rollers 83 are journaled therein with a conveyer belt or apron 84 passing therearound, said conveyer belt being provided with the usual slats 85. Secured to the journal brackets 82 and located inside the side plates 79 and 80 respectively are a pair of angle iron supports 86 carrying depending journal bearings 87 in which are journaled intermediate rollers 88 which form anti friction bearings or supports for the conveyer apron 84 between the end rollers 83, these depending journal bearings being provided with suitable oil cups 89 as shown in Fig. 5.

The shaft of the end roller 83 nearest the harvester proper is provided with a beveled pinion 90 meshing with a beveled gear 91 carried on a shaft 92 which is journaled at one end in a roller bearing bracket 93 on the end of the discharging conveyer frame and at its other end in a roller bearing 94 on the side plate 40. The shaft 92 has a gear wheel 95 loosely mounted on it with roller bearings therebetween, said gear wheel meshing with gear wheel 55. This gear wheel 95 is adapted to be clutched to the shaft 92 by means of a clutch member 96 which is splined to said shaft and has a toothed engagement with the sleeve of gear wheel 95, being normally held in engagement therewith by means of a coil spring 97 surrounding the shaft and bearing against a set collar 98 thereon. A yoked hand lever 99 is pivotally mounted to the frame and is connected to the clutch member 96 so that said clutch may be disengaged by the operator at will.

The gear wheel 55 in its movements, besides driving the chain conveyers as before described, is also adapted to drive the discharging conveyer by means of the gear wheel 95 and the shaft 92 with the intermeshing beveled pinions 90 and 91, so that the apron 84 is caused to carry the material received from the chain conveyers inwardly to a position behind the harvester proper. When the operation of the lever 99 to disengage the clutch 96 and stop the movement of the discharging conveyer is inconvenient, this is adapted to be accomplished by means of a foot lever 100, which is pivotally mounted on the frame of the harvester and has its rear cranked end 101 connected by means of a link 102 with said hand lever 99. A belt tightener pulley 103 is adjustably mounted on the bracket 71 and keeps the sprocket chain 75 from sagging and swinging and thereby prevents its disengagement from the sprocket wheels.

In order to keep the wheels of the side delivery mechanism free from obstruction when the ground is wet and muddy, scrapers 104 are adjustably secured to the brackets 26 and scrape against the guide wheels 27, and a scraper 105, is secured to the discharging conveyer frame to bear against the carrying wheel 25.

Outwardly extending dividing fingers 106 which are spread apart in a fan shape are fastened to the end of the cutter bar and are made of a material, such as Norway iron, which may be readily bent, so they can be adjusted to the desired position to suit different crops. As the machine is drawn forward they help to separate the uncut crop and spread it back upon itself out of the swath, leaving a clear path for the machine for the next cut.

In operation the harvester is driven in the usual manner, only the rotation of the drive wheels 10, besides operating the cutting mechanism as usual, drives the elevating conveyer comprising the several conveyer chains and with them the shaft 31 above the cutting mechanism, and also drives the discharging conveyer, all through the connecting means above described. The side delivery mechanism travels mainly upon the carrying wheel 25 and also to a minor degree upon the guide wheels 27 whose principal function, however, is to support the cutting mechanism at the desired distance above the ground, instead of having said cutting mechanism riding directly upon the ground. The cutting mechanism being carried a slight distance above the ground by the side delivery carriage does not produce the resistance to the onward movement of the machine that usually results from dragging it on the ground, and still the lifting of fallen and tangled vines is equally well accomplished, since the pointed front ends of the movable members of the guard fingers 32 drag upon the ground, their enlarged rounded bearing portions just behind their sharp pointed ends serving to prevent their entering too deeply into the ground and causing the points to only scrape along the surface. The vines are cut by the cutting mechanism in the usual manner and this operation is facilitated by the action of the pairs of toothed disks 47 and the prongs 48 which engage the vines and lift them upwardly to leave only their stalks to be cut by the cutting mechanism. These toothed disks also assist the prongs 48 of the conveyer chains 44 in lifting the vines after they have been cut onto the decking 37 of the elevating conveyer where they are carried upwardly and rearwardly by the conveyer chains at a greater speed than the travel of the machine, until they reach the upper end of the decking where the guard shields 53 strip them from the conveyer chains and the prongs and deposit them upon the discharging conveyer therebeneath. The vines at the outer edge of the elevating conveyer are deposited nearer to the rear edge of the discharging conveyer than those of the inner edge, by reason of their guard shields extending farther to the rear and also by reason of the oblique position of the discharging conveyer. The movement of the chain conveyers 44 is at a comparatively high speed, much greater than the speed of travel of the machine, and as before stated those near the outer edge of the elevating conveyer move at a successively greater speed, which serves to separate the cut vines from the uncut vines in this way. Should cut vines extend out of the swath of the machine and be entangled with uncut vines, the faster movement of the outside conveyer chains will comb them rearwardly, and as their cut ends are caught by the other chain conveyers which are not moving so fast, the tangled ends are pulled from the uncut vines and brought up into the machine. Also, should vines which are rooted beyond the swath of the harvester extend over into the swath and be tangled with cut vines, the cut vines which may be engaged with the prongs of the slower moving conveyer chains will be held by them while the faster moving conveyer chains at the outer edge of the conveyer are combing out the uncut vines and pulling them loose from said cut vines. When the faster moving teeth of the wheel 52 engage the uncut vines they are forcibly thrown off of the mechanism and the parting rods 106 spread them back upon the other uncut vines ready for the next cut. Another advantage incidental to the use of the fast moving chain conveyers, is that objects such as Canadian thistles, sticks and stones which are heavier than the vines being harvested and which may be taken up by the machine, are automatically separated from the vines by being thrown by the chain conveyers entirely over the discharging conveyer. This operation as well as the others herein referred to have been found, in the actual operation of the machine in practice, to be as stated.

The discharging conveyer receives the vines from the elevating conveyer and carries them to one side, discharging them in a continuous windrow behind the harvester proper so far to the side thereof as to be out of the path of the draft horses during the next succeeding cut. If it is preferred to discharge the material in bunches instead of in a windrow, the operator may throw the hand lever 99 to disconnect the clutch 96, or by operating the foot lever 100 the same effect may be produced, and the movement of the discharging conveyer will cease until said clutch is again engaged by the release of the lever so operated, when the accumulated bunch of cut material will be discharged. Should it be desired to stop the operation of the elevating conveyer, as during the movements of the machine without the operation of the cutting mechanism, the lever 77 may be thrown to disconnect clutch 73, and may be held in its thrown position in any desirable manner until further operation is desired. Obviously the disconnection of the clutch 73 will cause the movements of both conveyers to cease.

The side delivery mechanism, being pivotally connected with the cutting mechanism and drawn along thereby upon its carriage, is given no rigid connection with the harvester proper, so that it may be free to follow the irregularities of the surface of the ground without binding or endangering its connections, and for this reason the driving connection with the harvester proper is made telescopic and yielding by means of the sliding sleeve and rod connection with its pair of universal couplings. This telescopic connection is also protected by means of the buffer springs 66 to prevent jar of the mechanism during the movements of the side delivery mechanism from side to side in order that there may be no violent pounding.

The side delivery mechanism, though receiving its draft and power from the harvester proper, has its connections so arranged that the tilting of the cutting mechanism by means of the lever 21 in the usual manner is not interfered with, and the lifting of the cutting mechanism by means of the hand lever 16 or the foot lever 19 may be accomplished in the usual manner, except that the side delivery mechanism is moved with it, the carrying wheel 25 thereof constituting a fulcrum upon which it swings, lifting the guide wheels 27 from the ground slightly and lowering the discharging conveyer. The carrying wheel 25 having a broad rounded tread is capable of turning with the harvester proper while the cutting mechanism is raised without offering obstruction to the turning movement.

The curvature given to the decking 37 of the elevating conveyer is such that it stands as close as possible to the conveyer chains without contacting therewith, and thus forms a bearing surface for the vines being elevated which will relieve the conveyer chains of the weight thereof to a considerable degree, and so reduce the resistance to the operation of the machine besides preventing waste of material. The discharging conveyer apron 84 is also relieved of its burden by the support it receives from the intermediate rollers 88.

The elevating conveyer alone may be used if it is set obliquely and such constructions are contemplated by this invention.

The term "conveyer" as here used is intended in its broadest sense, including chutes and the like.

The toothed disks 47 are prevented from becoming tangled with vines by means of a slotted plate 47' which is mounted across the inclined frame and is provided with upstanding flanges along its slots to receive the disks between them and clear the vines therefrom.

What I claim as my invention is:

1. In combination with a cutting mechanism, an endless conveyer for side delivery mechanism, comprising a series of conveyer chains extending rearwardly from above the cutting mechanism and having prongs to engage and straighten the material in front of the cutting mechanism.

2. In combination with a cutting mechanism, an endless conveyer, comprising a series of pronged conveyer chains extending rearwardly from above the cutting mechanism to engage and straighten the material in front of the cutting mechanism, and shields for stripping the cut material from the conveyer chains.

3. In combination with a cutting mechanism, an elevating conveyer comprising a series of pronged conveyer chains extending rearwardly from above the cutting mechanism to engage and straighten the material in front of the cutting mechanism, and an inclined decking extending beneath the conveying portions of the conveyer chains.

4. In combination with a cutting mechanism, a side delivery mechanism comprising an endless conveyer of pronged conveyer chains extending rearwardly from above the cutting mechanism to engage and straighten material in front of the cutting mechanism, a decking beneath the conveyer portions of the conveyer chains to support the material carried thereby, and guard plates between and extending beyond the conveyer chains to strip the material therefrom.

5. In combination with a cutting mechanism, a side delivery mechanism comprising a series of conveyer chains adapted to receive the cut material and move it rearwardly, and means for driving the chains with the outside chain moving at a relatively greater speed than the other chains, whereby the uncut material is separated from the cut material.

6. In combination with a cutting mechanism, a side delivery mechanism comprising a series of conveyer chains adapted to receive cut material, and a toothed wheel alongside of the conveyer chains moving at a greater speed than said conveyer chains to separate the uncut material from the cut material.

7. In combination with vine cutting mechanism, a side delivery attachment, comprising a series of conveyer chains adapted to receive the cut vines, means for driving the conveyer chains with the chains nearer the outer end of the cutting mechanism moving at successively greater speeds, and a toothed wheel located alongside of the outside conveyer chain and moving at a greater speed than said chain, whereby uncut vines whose ends are tangled with cut vines will be caught at their intermediate portions by the faster moving chains and the toothed wheel and separated from the cut vines.

8. In combination with a cutting mechanism, a frame adapted to be connected to the cutting mechanism, means for supporting the frame, a front shaft and a rear shaft carried by the frame, sprocket wheels on the rear shaft, chain guiding means on the front shaft, conveyer chains passing around the sprocket wheels and the chain guiding means and adapted to convey the cut material from the cutting mechanism, and means for driving the rear shaft, the outside sprocket wheel being larger than the other sprocket wheels so that the outside conveyer chain will move faster than the others and thereby separate the uncut material from the cut material.

9. In combination with a machine having a cutting mechanism, a frame adapted to be connected to the cutting mechanism, means for supporting the frame, a front shaft and a rear shaft carried by the frame, sprocket wheels on the rear shaft, chain guiding means on the front shaft, conveyer chains passing around the sprocket wheels and the chain guiding means and adapted to convey the cut material from the cutting mechanism, a toothed wheel on the rear shaft of greater diameter than the sprocket wheels, and means for driving the rear shaft, said toothed wheel serving by its greater speed to separate the uncut material from the cut material.

10. In combination with a cutting machine, a frame adapted to be connected to the mechanism of the machine, means for supporting the frame, a front shaft and a rear shaft carried by the frame, sprocket wheels on the rear shaft, chain guiding means on the front shaft, conveyer chains passing around the sprocket wheels and the chain guiding means and adapted to convey the cut material from the cutting mechanism, a toothed wheel on the rear shaft of greater diameter than the sprocket wheels, and means for driving the rear shaft, the outside sprocket wheels being of successively larger diameter than the other sprocket wheels so that the outside conveyer chains will move faster than the others and in conjunction with the faster moving toothed wheel will separate the uncut material from the cut material.

11. In combination with a cutting machine, a suitably mounted frame adapted to be connected to the cutting mechanism of the cutting machine, a front shaft and a rear shaft carried by the frame, sprocket wheels on the rear shaft, chain guiding means on the front shaft, conveyer chains passing around the sprocket wheels and the chain guiding means, one of said chain guiding means consisting of a sprocket wheel whereby the front shaft is caused to rotate by the movement of the rear shaft, prongs on the conveyer chains, means for driving the rear shaft, and toothed disks on the front shaft, said prongs and toothed disks being adapted to engage and straighten the material before it is cut.

12. In combination with a cutting machine, a suitably mounted frame adapted to be connected to the cutting mechanism of the cutting machine, a front shaft and a rear shaft carried by the frame, sprocket wheels on the rear shaft, chain guiding means on the front shaft, conveyer chains passing around the sprocket wheels and chain guiding means one of said chain guiding means constituting a sprocket wheel whereby the front shaft is caused to rotate by the movement of the rear shaft, means for driving the rear shaft, and means on the front shaft for engaging the material being cut.

13. In combination with a cutting machine, a frame adapted to be connected to the cutting mechanism of the cutting machine, means for supporting the frame, a front shaft and a rear shaft carried by the frame, sprocket wheels on the rear shaft, chain guiding means on the front shaft, conveyer chains passing around the sprocket wheels and chain guiding means, one of said chain guiding means constituting a sprocket wheel by which the front shaft is driven by the rear shaft, means for driving the rear shaft, and toothed disks mounted on the front shaft for engaging the material being cut.

14. In combination with a side delivery mechanism for a cutting machine, a frame adapted to be connected to the cutting mechanism of the machine, a carrying wheel on which the frame is pivotally mounted, a pair of guide wheels on the front part of the frame for determining the elevation of the cutting mechanism, a front and rear shaft carried by the frame, an endless conveyer mounted on the front and rear shafts, and means for driving the conveyer, said frame being pivoted upon its carrying wheel to lift its guide wheels from the ground when the cutting mechanism is raised.

15. In combination with a side delivery mechanism for a cutting machine, a frame adapted to be connected to the cutting mechanism of the machine, a carrying wheel on which the frame is pivotally mounted, and guide wheels adjustably mounted at the front part of the frame and adapted to support the cutting mechanism at a predetermined distance above the ground and cause the cutting mechanism to follow irregularities of the ground, said frame being pivoted upon its carrying wheel to lift the guide wheels from the ground when the cutting mechanism is raised.

16. In combination with a cutting machine, a frame adapted to be connected to the cutting mechanism of the cutting machine, means for supporting the frame, a front shaft and a rear shaft carried by the frame, sprocket wheels on the rear shaft, chain guiding means on the front shaft, conveyer chains passing around the sprocket wheels and the chain guiding means and adapted to convey material from the cutting mechanism, one of said chain guiding means constituting a sprocket wheel by which the front shaft is driven by the rear shaft, means for driving the rear shaft, toothed disks carried by the front shaft, and a clearing plate having flanged slots through which the toothed disks pass for having the material stripped therefrom.

17. In combination, a cutting mechanism having guard fingers with movable members, a suitably mounted frame connected to the cutting mechanism, a front shaft carried by the frame above the cutting mechanism, a rear shaft on the frame, sprocket wheels carried by the rear shaft, chain guiding means on the front shaft, conveyer chains with pairs of engaging prongs passing around the sprocket wheels and the chain guiding means, means for driving the conveyer chains, and chain guiding fingers on the movable members of the guard fingers for guiding the chains to the chain guiding means by projecting between the prongs thereof.

18. In combination with a cutting mechanism, a side delivery mechanism comprising a rearwardly moving conveyer formed by conveyer chains having prongs running close to and in front of the cutting mechanism to elevate and straighten the material in front of the cutting mechanism, and a side delivery conductor for receiving the cut material from the conveyer.

19. In combination with a cutting mechanism, a side delivery mechanism comprising an elevating conveyer formed by a series of pronged conveyer chains running close to and in front of the cutting mechanism and adapted to lift and straighten the material in front of the cutting mechanism, shields for stripping the cut material from the conveyer chains, and a side delivery conductor into which the material is deposited by said shields.

20. In combination with a cutting mechanism, an elevating conveyer comprising a series of pronged conveyer chains adapted to receive the cut material from the cutting mechanism, an inclined decking extending beneath the conveying portions of the conveyer chains and curved to conform to the sagging of the conveyer chains and support the material carried thereby, and a side delivery conductor onto which the material is deposited by the conveyer chains.

21. In combination with a cutting machine, a side delivery mechanism comprising a suitably mounted frame adapted to be connected to the cutting mechanism of the cutting machine, an elevating conveyer for receiving the cut material from the cutting mechanism comprising a series of conveyer chains, guard shields located between the conveyer chains and adapted to strip the material therefrom, and a side delivery conductor to receive the material from the guard shields, said guard shields successively extending farther to the rear so that the material will be discharged evenly upon the side delivery conductor.

22. In combination with a cutting machine, a side delivery mechanism comprising a suitably mounted frame adapted to be connected to the cutting mechanism of the cutting machine, an elevating conveyer for receiving the cut material from the cutting mechanism comprising a series of conveyer chains, guard plates located between the conveyer chains and adapted to strip the material therefrom, and a side delivery conductor extending laterally and obliquely from the rear end of the frame to receive the material from the guard plates, said guard plates successively extending farther to the rear so that the material will be discharged evenly upon the side delivery conductor.

23. In combination with a cutting machine, a side delivery mechanism, comprising a suitably mounted frame adapted to be connected to the cutting mechanism of the cutting machine, an elevating conveyer for receiving the cut material from the cutting mechanism comprising a series of conveyer chains, guard plates located between the conveyer chains and adapted to strip the material therefrom, the cutting mechanism being hinged beneath the front end of the elevating conveyer and a side delivery conductor comprising a frame connected to the first mentioned frame and extending laterally therefrom, rollers mounted on the frame, and a conveyer apron passing around the rollers.

24. In combination with a cutting mechanism, an endless conveyer comprising a series of conveyer chains extending rearwardly from above the cutting mechanism and having prongs to engage and straighten the material in front of the cutting mechanism.

In testimony whereof, I affix my signature, in presence of two witnesses.

FRANK HAMACHEK.

Witnesses:
R. S. C. CALDWELL,
ANNA F. SCHMIDTBAUER.